(12) United States Patent
Li

(10) Patent No.: US 8,126,278 B2
(45) Date of Patent: Feb. 28, 2012

(54) IMAGE PROCESSING METHOD USING A CREST LINE DIAGRAM AS A BASIS

(75) Inventor: Chih Shan Li, Taipei County (TW)

(73) Assignee: Silicon Integrated Systems Corp., Hsin Chu (TW)

(*) Notice: Subject to any disclaimer, the term of this patent is extended or adjusted under 35 U.S.C. 154(b) by 979 days.

(21) Appl. No.: 12/108,929

(22) Filed: Apr. 24, 2008

(65) Prior Publication Data

US 2009/0268979 A1    Oct. 29, 2009

(51) Int. Cl.
*G06K 9/00* (2006.01)
(52) U.S. Cl. .......................... 382/232; 382/299
(58) Field of Classification Search .................. 382/274, 382/232, 299
See application file for complete search history.

(56) References Cited

U.S. PATENT DOCUMENTS

| | | | | |
|---|---|---|---|---|
| 5,621,819 A * | 4/1997 | Hozumi | ........................ | 382/232 |
| 5,635,723 A * | 6/1997 | Fujieda et al. | ................ | 250/556 |
| 5,647,024 A * | 7/1997 | Kawauchi et al. | ............ | 382/232 |
| 7,003,176 B1 * | 2/2006 | Suzuki et al. | ................. | 382/299 |
| 7,583,859 B2 * | 9/2009 | Suzuki et al. | ................. | 382/298 |
| 7,817,844 B2 * | 10/2010 | Kitamura et al. | ............ | 382/141 |
| 2005/0237544 A1 * | 10/2005 | Suzuki et al. | ................. | 358/1.2 |

* cited by examiner

*Primary Examiner* — Hadi Akhavannik
(74) *Attorney, Agent, or Firm* — Muncy, Geissler, Olds & Lowe, PLLC

(57) ABSTRACT

The invention discloses an image processing method. The image processing method utilizes the relatively low point and the relatively high point of the luminance of the pixels in the frame to generate the crest lines. Then, various image processing are performed according to the state of the crest line.

9 Claims, 15 Drawing Sheets

IMAGE PROCESSING METHOD USING A CREST LINE DIAGRAM AS A BASIS

BACKGROUND OF THE INVENTION (a) Field of the Invention

The invention relates to an image processing method, and particularly to an image processing method utilizing the crest line to process.

(b) Description of the Related Art

In general, during the image processing such as the low angle de-interlacing processing, one frame of the image data is synthesized by two fields where one frame is divided into one field comprising odd numbered scan lines (such as: the first, third, fifth, ... scan lines) and the other field comprising even numbered scan lines (such as: the zero, second, fourth, ... scan lines).

In the same field, the scan line $L(i+1)$ located between the scan line $L(i)$ and the scan line $L(i+2)$ should be estimated, as shown in FIG. 1. As the luminance color difference (YUV) value of the pixel P located between the segment $L(i)$ and the segment $L(i+2)$ is to be estimated first, the differences of the Y value components of various angles (as shown by the arrows in the figure) of the scan lines $L(i)$ and $L(i+2)$ corresponding to the pixel P must be estimated and then the smallest one among these differences of the Y value components is taken as the angle of the pixel P. Finally, the average of the luminance color difference values of the two pixels having the smallest Y value component difference is taken as the YUV value of the pixel P.

BRIEF SUMMARY OF THE INVENTION

In light of the above mentioned problems, an object of the invention is to provide a new image processing method.

The grey scale image comprised by the Y value components of any image can be considered as a map while the crest line diagram can clearly describe the characteristics of such a map. Therefore, we can utilize such characteristics as the basis for image processing.

One embodiment of the invention provides an image processing method comprising the following steps. Firstly, a frame that comprises a plurality of pixels is received. The luminance (Y) of each pixel is analyzed to find out the luminance distribution of the frame. According to the state of the luminance distribution, a plurality of crest lines for the luminance distribution is derived. Finally, according to the crest lines, image processing for the frame can be carried out.

Another embodiment of the invention provides an image processing method comprising the following steps. At first, a frame that comprises at least a first, at least a second, and at least a third scan lines, is received. The first and the third scan lines have a plurality of pixels while the pixel parameter of the second scan line is unknown. The luminance (Y) of each pixel is analyzed to find out the luminance distribution of the frame. Then, according to a plurality of predetermined criteria, a plurality of related indexes of the luminance between each pixel and other pixel are calculated so as to determine the relatively darkest and relatively brightest pixels within a predetermine length on the first and third scan lines. According to the related indexes to connect the relatively darkest pixels of the first and the third scan lines, a first crest line is generated. According to the related indexes to connect the relatively brightest pixels of the first and the third scan lines, a second crest line is generated. According to the luminance of pixels on the two crest lines, the luminance of each pixel of the second scan line between the first and the second crest lines is obtained. Finally, the image parameter of each pixel of the second scan line is obtained according to the luminance values of the second scan line.

Another embodiment of the invention provides an image processing method comprising the following steps. At first, a frame that comprises a plurality of pixels is received. The horizontal level difference of neighboring pixels is defined to generate at least a first index. The high/low point of neighboring pixels is defined to generate at least a second index. At least a connecting criterion for the high/low crest line is defined to generate at least a third index. The right left flag of each pixel is defined to generate at least a fourth index. Whether the pixel belongs to the pixel with a high angle or not is determined to generate at least a fifth index. The left-to-right width of the crest line is determined to generate at least a sixth index. The left/right direction of the connecting crest line is determined to generate at least a seventh index. According to the first, second, third, fourth, fifth, sixth, seventh indexes, the high point pixels are connected to generate at least a first crest line while the low point pixels are connected to generate at least a second crest line. According to the first, second, third, fourth, fifth, sixth, seventh indexes and the crest lines, the image parameters of the pixels are calculated.

The image processing method according to the embodiments of the invention utilizes the relatively low points and the relatively high points for the luminance of the pixels in the frame to obtain the crest lines. Various image processing can be performed according to the state of the crest lines

DETAILED DESCRIPTION OF THE INVENTION

Detail descriptions of the image processing method according to the invention will be given in the following accompanying with the various schematic diagrams.

Figure 2:
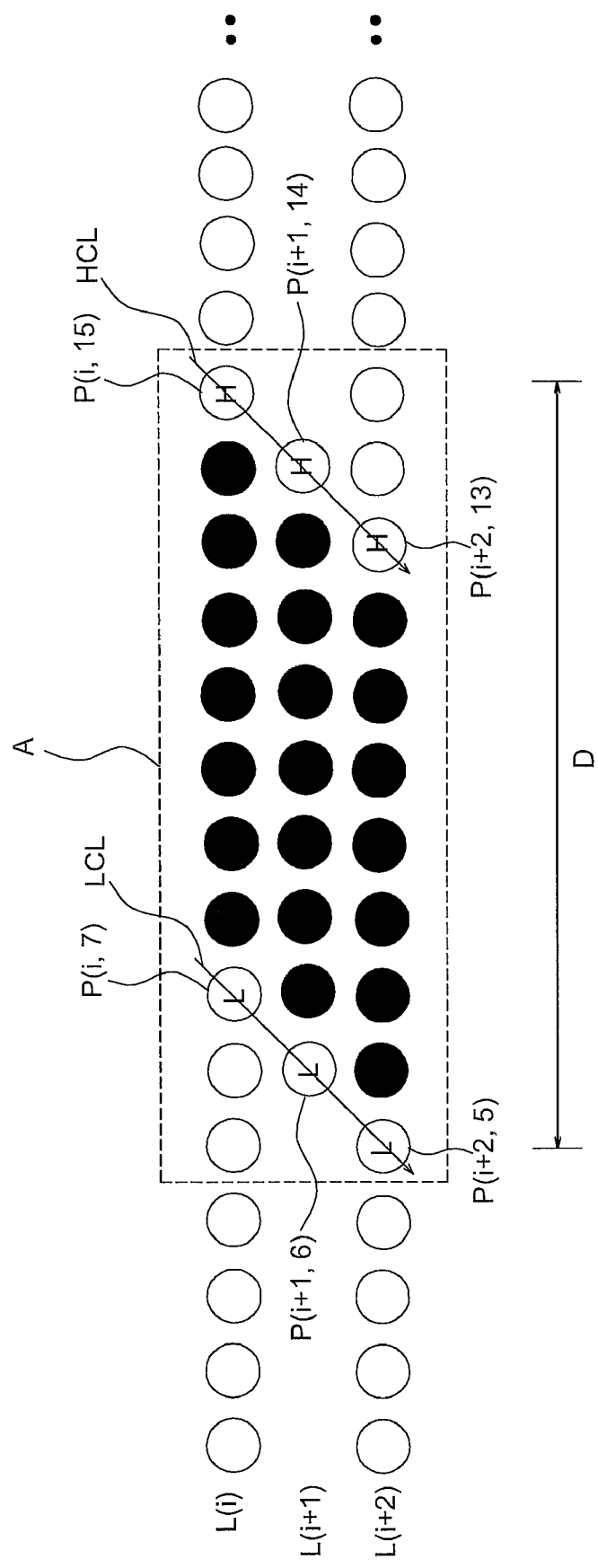
FIG. 2 shows a schematic diagram illustrating the calculation of the luminance color difference value of a frame according to one embodiment of the invention.

FIG. 2 shows a schematics diagram illustrating the field of a frame with part of the scan lines (for example: the field including the odd numbered scan lines (1, 3, 5, ...) according to the prior art). As shown in the figure, the $L(i)$ is the first scan line, the $L(i+1)$ is the second scan line, and $L(i+2)$ is the third line. The parameters of every pixel for the first and the third scan lines (such as: the luminance color difference value (YUV)) are known while the parameters of the pixels of the second scan line are unknown.

As shown in FIG. 2, the image processing method of the invention is to analyze the luminance $Y(i, j)$ and $Y(i+2, j)$ of each pixel on the first and the third scan lines and then find out the relatively darker (low point) pixels and the relatively brighter (high point) pixels within a predetermined range A or a predetermined length D. As shown in the figure, the relatively darker pixel is P(i, 7) and the relatively brighter pixel is P(i, 15) for the first scan line L(i) and the relatively darker pixel is P(i+2, 5) and the relatively brighter pixel is P(i+2, 13) for the third scan line L(i+2). Then, the target pixels, the P(i, 7) and the P(i+2, 5), of the two scan lines L(i) and L(i+2) are connected into a line to generate a low crest line LCL by connecting the pixels having relatively lower luminance while the target pixels, the P(i, 15) and the P(i+2, 13) are connected into a line to generate a high crest line HCL by connecting the pixels having relatively higher luminance. Then, the low crest line LCL can be used to estimate the position of the relative low points of the second scan line L(i+1), that is, the low point is the pixel P(i+1, 6). The high crest line HCL can be used to estimate the position of the relative high points of the second scan line L(i+1), that is, the high point is the pixel P(i+1,14). Furthermore, the angle for each of the P(i+1, 6)~P(i+1, 14) pixels can be determined to calculate the image parameters for each of the P(i+1, 6)~P(i+1, 14) pixels, such as the luminance color difference value YUV.

Figure 1:
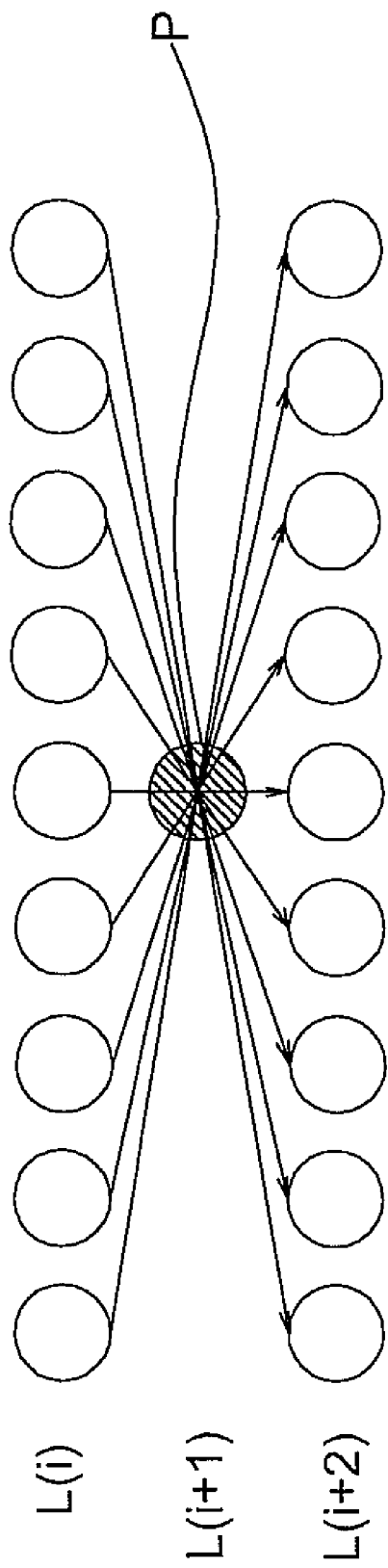
FIG. 1 shows a schematic diagram illustrating the calculation of the luminance color difference value of a frame according to the prior art.

For example, the pixel P(i+1, 6) of the second scan line can be calculated directly according to the angle of the crest line LCL. The average value of the luminance color difference values YUV of the pixel P(i, 7) of the first scan line and the pixel P(i+2, 5) of the third scan line can be taken as the luminance color difference value YUV of the pixel P(i+1, 6). Thus, the problem that the angle of the pixel cannot be determined in advance according to the prior art shown in FIG. 1 can be avoided. In the prior art, different YUV average values of various angles must be calculated at first and then the smallest YUV value can be determined so as to use this angle having smallest YUV value as the angle of the pixel. Therefore, the image processing method according to embodiments of the invention can spare more system resources and speed up the processing speed in comparison with the prior art.

Figure 3A:
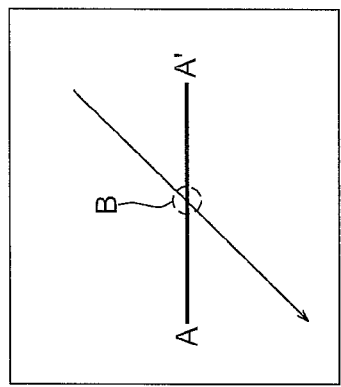
FIGS. 3A~5B show the schematic diagrams illustrating the examples of calculating the luminance color difference values according to embodiments of the invention.
Figure 3B:
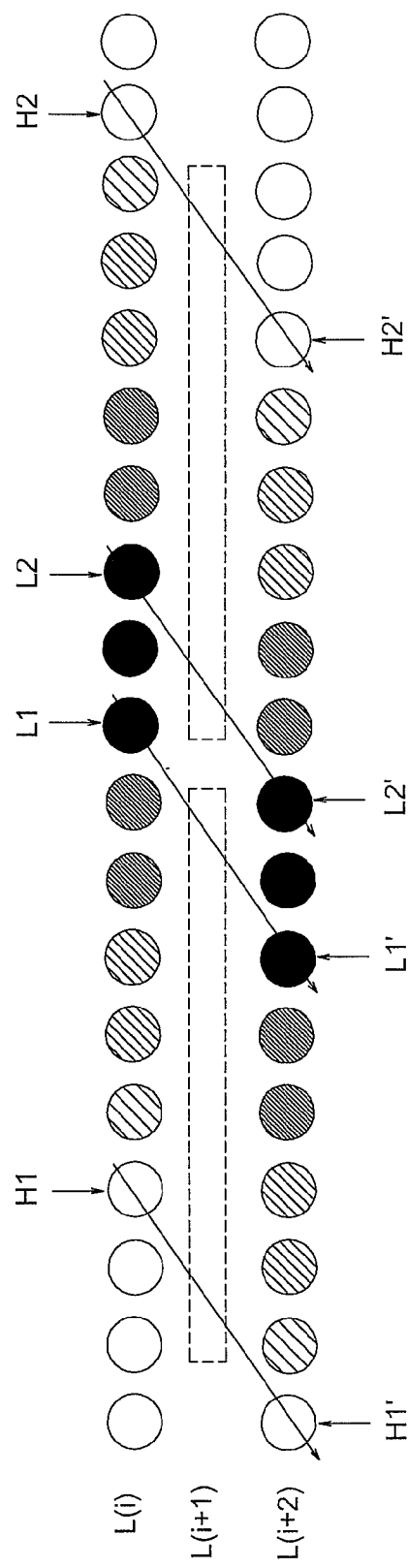
Figure 4A:
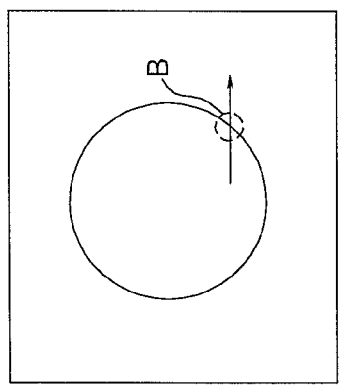
Figure 4B:
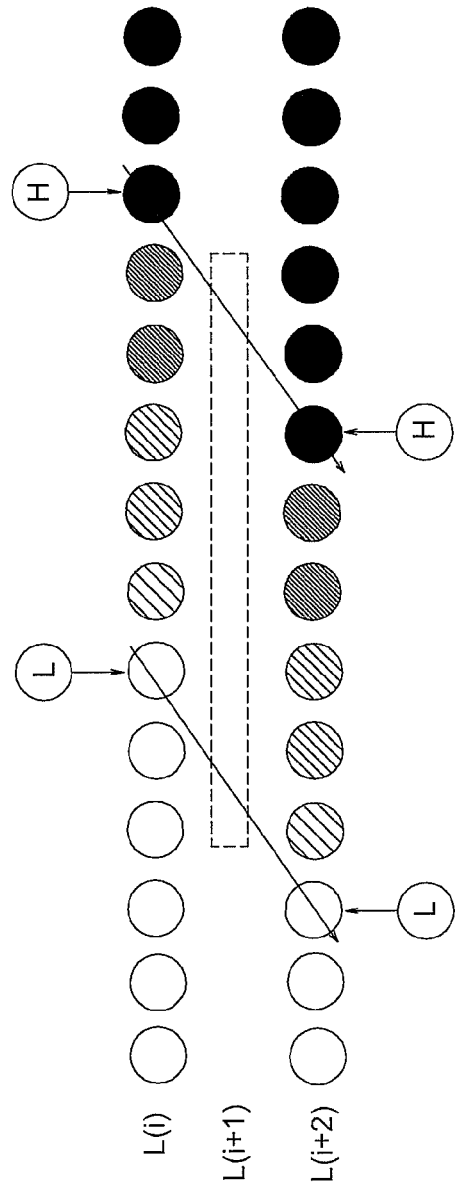
Figure 5A:
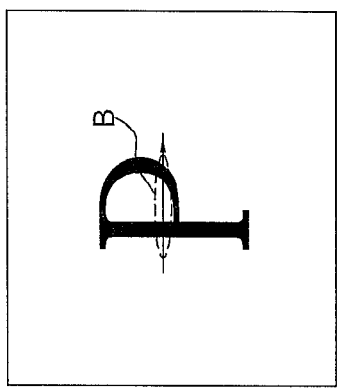
Figure 5B:
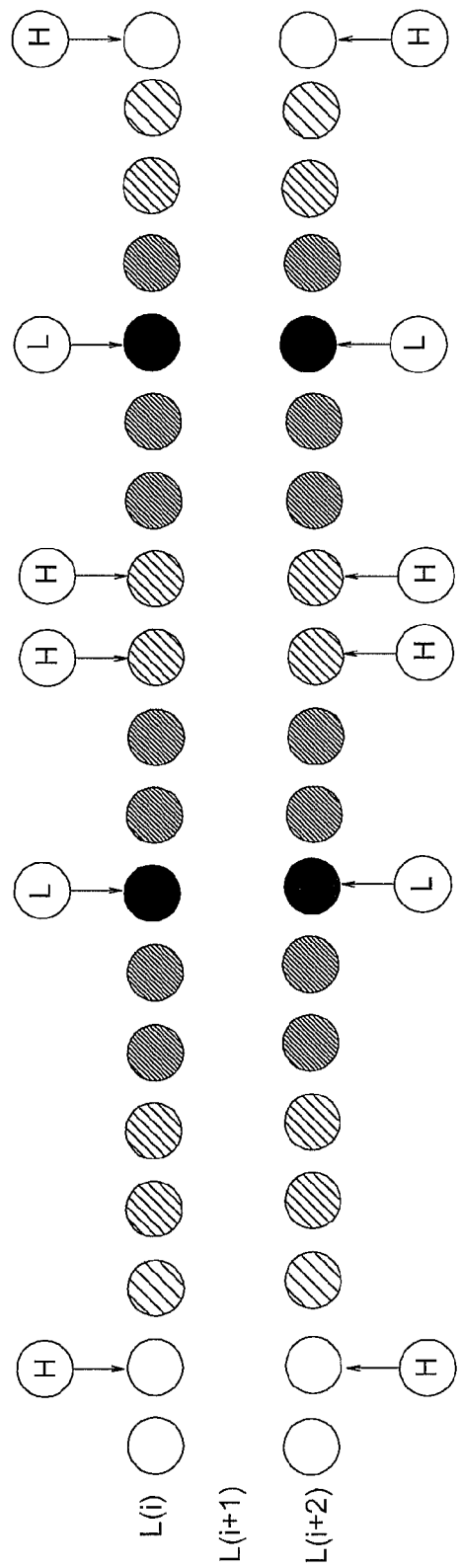

FIGS. 3A~5B show the schematic diagrams illustrating the examples of image processing by the image processing method according to the invention. As shown in FIGS. 3A and 3B, the image shown in FIG. 3A is a line and the Y value component of the portion B of the segment is shown enlarged in FIG. 3B. As shown in the figure, the four crest lines are generated by connecting the H1H1', the L1L1', the L2L2', and the H2H2' of the relatively darker pixels (designated as the L1, L1', L2, and L2' in the figure) and the relatively brighter pixels (designated as the H1, H1', H2, and H2' in the figure) of the first and the third scan lines L(i), L(i+2). From the four crest lines, it can be understood that the luminance color difference value of the pixel of the second scan line L(i+1) should be derived from the average of which two points. The luminance color difference value of the pixel of the second scan line L(i+1) can be obtained. Thus, the image luminance color difference values YUV of the in-between scan lines in FIGS. 4A, 4B and FIGS. 5A, 5B can be derived from the crest lines generated by connecting the relatively brighter pixels H on different scan lines and the crest lines generated by connecting the relatively darker pixels L on different scan lines. Further details will not be repeated herein.

Figure 6:
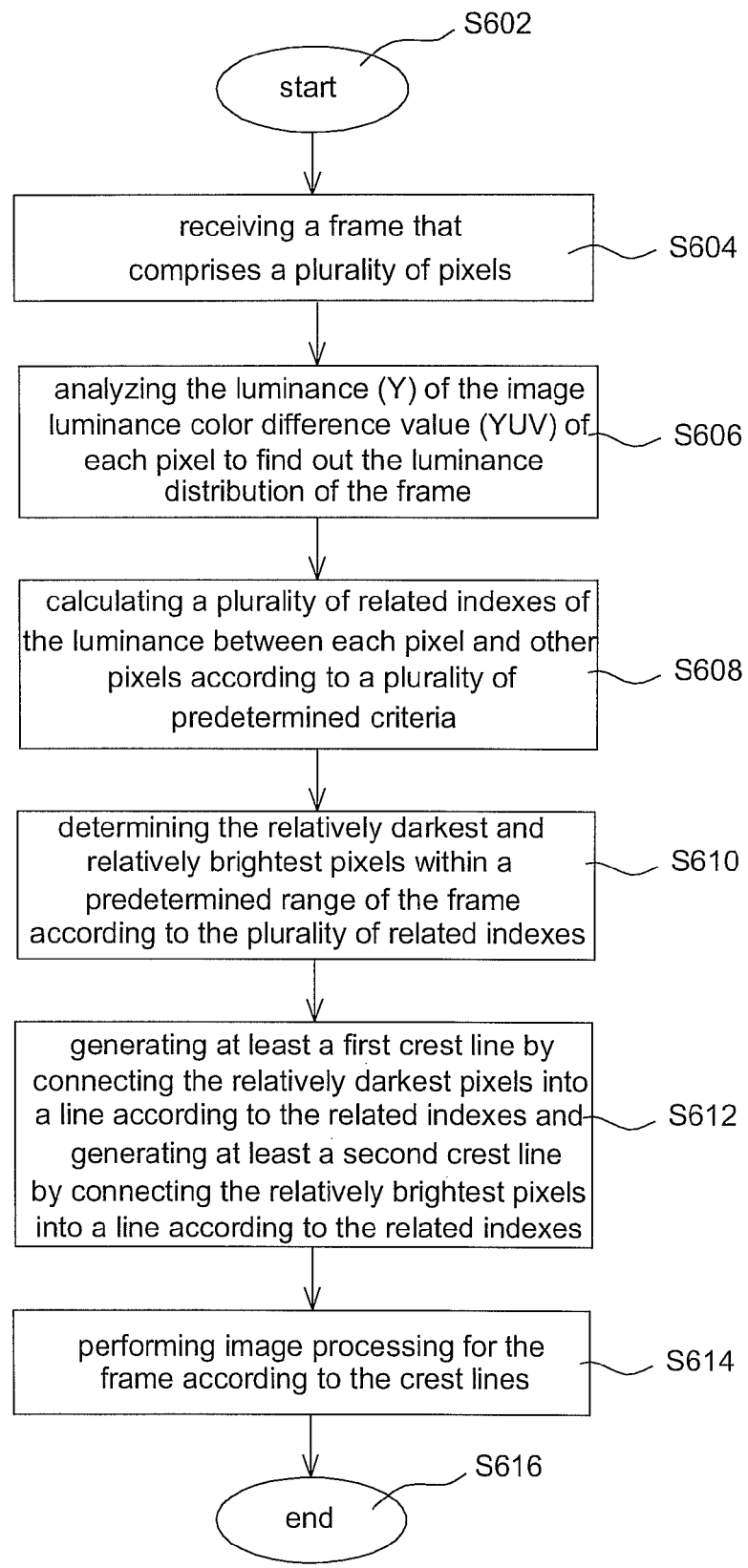
FIG. 6 shows a flow chart illustrating the image processing method according to one embodiment of the invention.

FIG. 6 shows a flow chart illustrating the image processing method according to one embodiment of the invention. The method comprises the following steps:

Step S602: start;

Step S604: receiving a frame that comprises a plurality of pixels;

Step S606: the pixel analyzing step to analyze the luminance (Y) of the image luminance color difference value (YUV) of each pixel to find out the luminance distribution of the frame;

Step S608: the related indexes calculating step to calculate a plurality of related indexes of the luminance between each pixel and other pixels according to a plurality of predetermined criteria;

Step S610: the target pixel searching step to determine the relatively darkest and relatively brightest pixels within a predetermined range of the frame according to the plurality of related indexes;

Step S612: the pixel connecting step to generate at least a first crest line by connecting the relatively darkest pixels into a line according to the related indexes and to generate at least a second crest line by connecting the relatively brightest pixels into a line according to the related indexes;

Step S614: the image processing step to perform image processing for the frame according to the crest lines; and Step S616: end.

It should be noted that, according to the descriptions up to now, those who are skilled in the art should be able to understand how to perform various image processing by utilizing the crest lines. Therefore, further details about the processing will not be repeated herein. The above mentioned image processing comprises at least calculating the image parameter of each pixel.

Figure 7A:
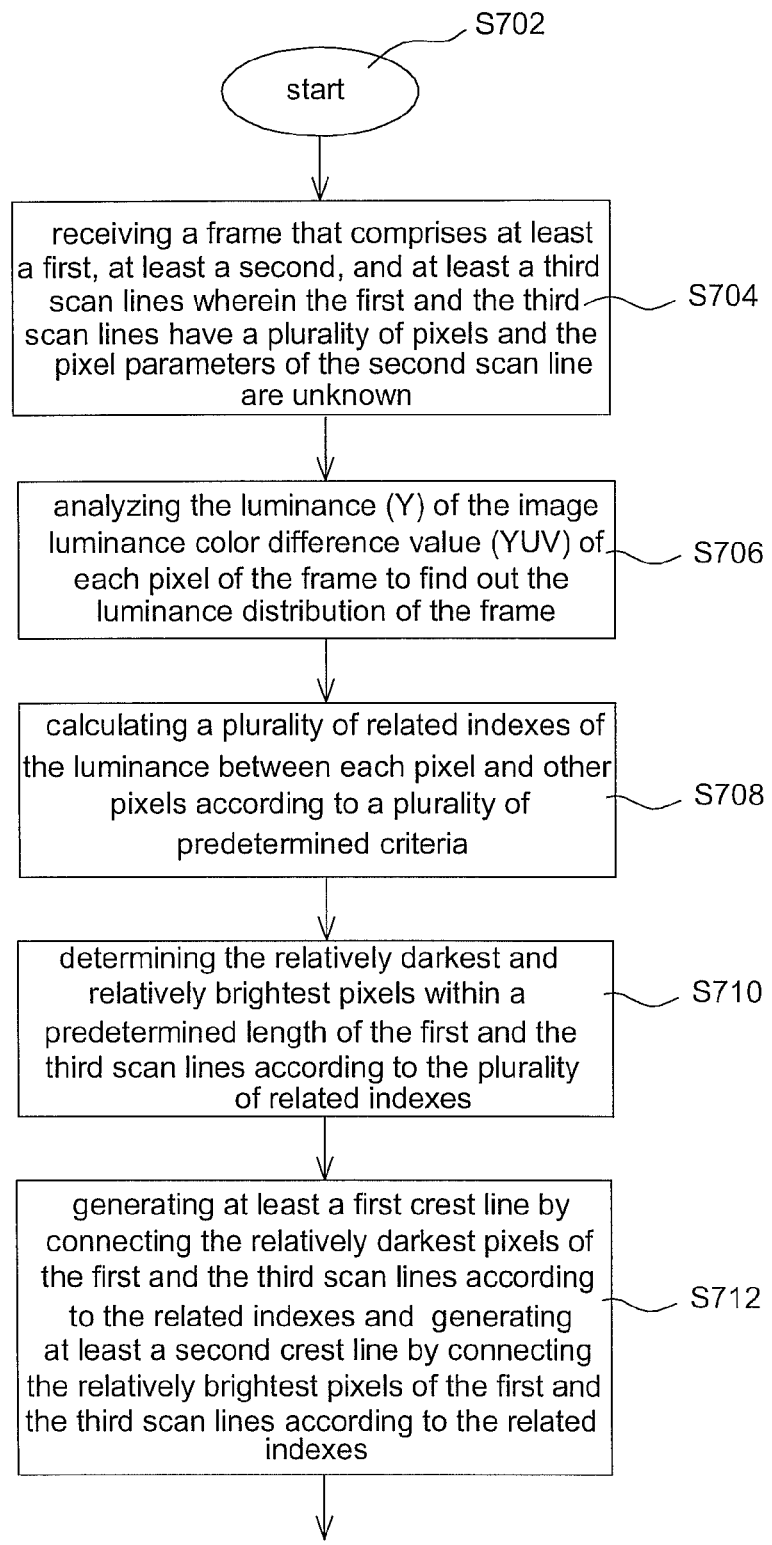
FIG. 7A~7B shows a flow chart illustrating the image processing method according to another embodiment of the invention.
Figure 7B:
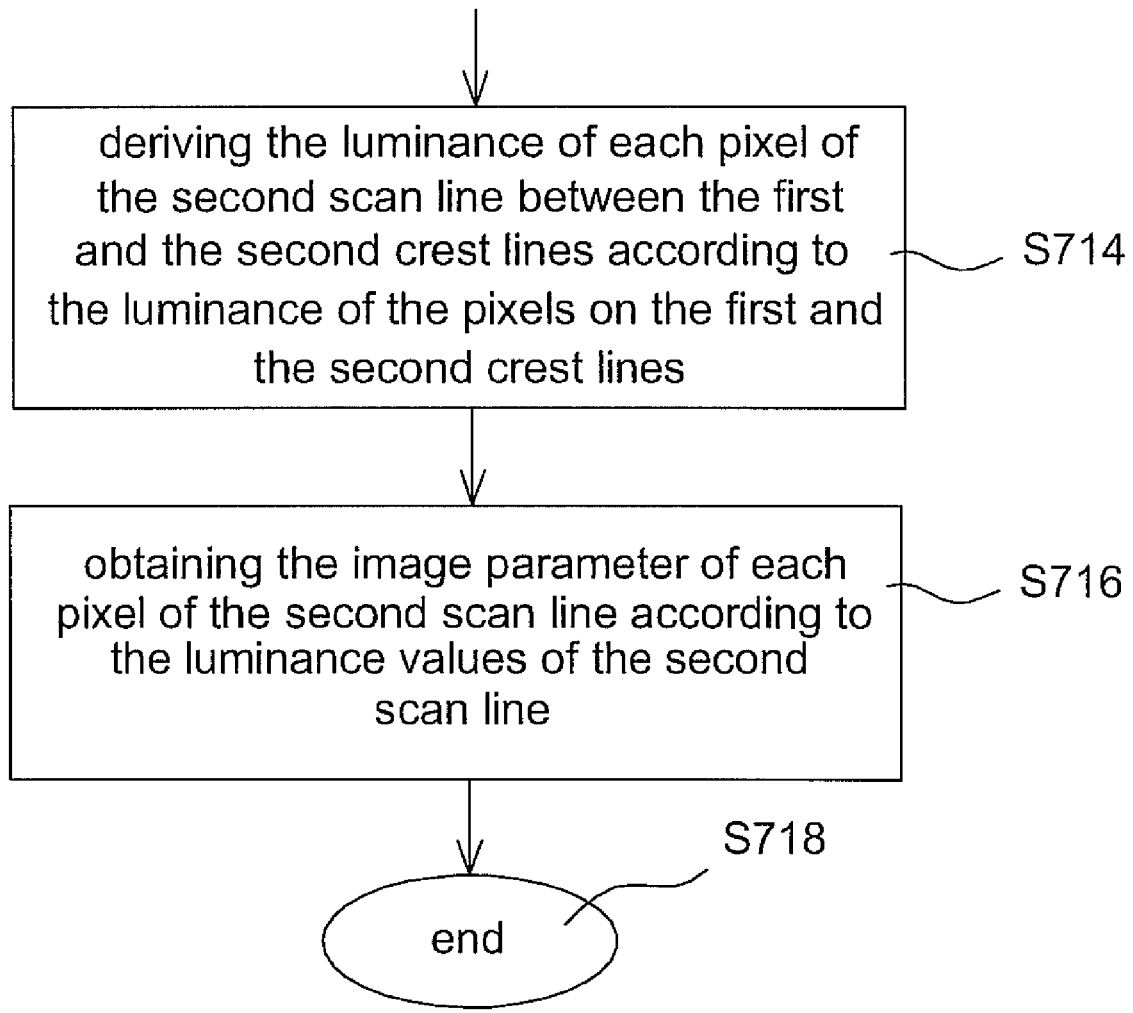

FIG. 7A~7B shows a flow chart illustrating the image processing method according to another embodiment of the invention. The method comprises the following steps:

Step S702: start;

Step S704: receiving a frame that comprises at least a first, at least a second, and at least a third scan lines wherein the first and the third scan lines have a plurality of pixels and the pixel parameters of the second scan line are unknown;

Step S706: analyzing the luminance (Y) of the image luminance color difference value (YUV) of each pixel of the frame to find out the luminance distribution of the frame;

Step S708: calculating a plurality of related indexes of the luminance between each pixel and other pixels according to a plurality of predetermined criteria;

Step S710: determining the relatively darkest and relatively brightest pixels within a predetermined length of the first and the third scan lines according to the plurality of related indexes;

Step S712: generating at least a first crest line by connecting the relatively darkest pixels of the first and the third scan lines according to the related indexes and generating at least a second crest line by connecting the relatively brightest pixels of the first and the third scan lines according to the related indexes;

Step S714: deriving the luminance of each pixel of the second scan line between the first and the second crest lines according to the luminance of the pixels on the first and the second crest lines;

Step S716: obtaining the image parameter, such as the image luminance color difference value, of each pixel of the second scan line according to the luminance values of the second scan line; and Step S718: end.

It should be noted that the plurality of predetermined criteria and the plurality of related indexes in the above mentioned embodiments can be determined by the designer. Related indexes, such as horizontal level difference, high/low points, high/low lines, high angles, crest line estimation, right/left flag, high angle correction, and low angle correction or any combination of the above, can be designed by those who are skilled in the art. Certainly, the criteria and the related indexes are not limited to the above mentioned examples and can be decided based on the design and the requirements.

Figure 8:
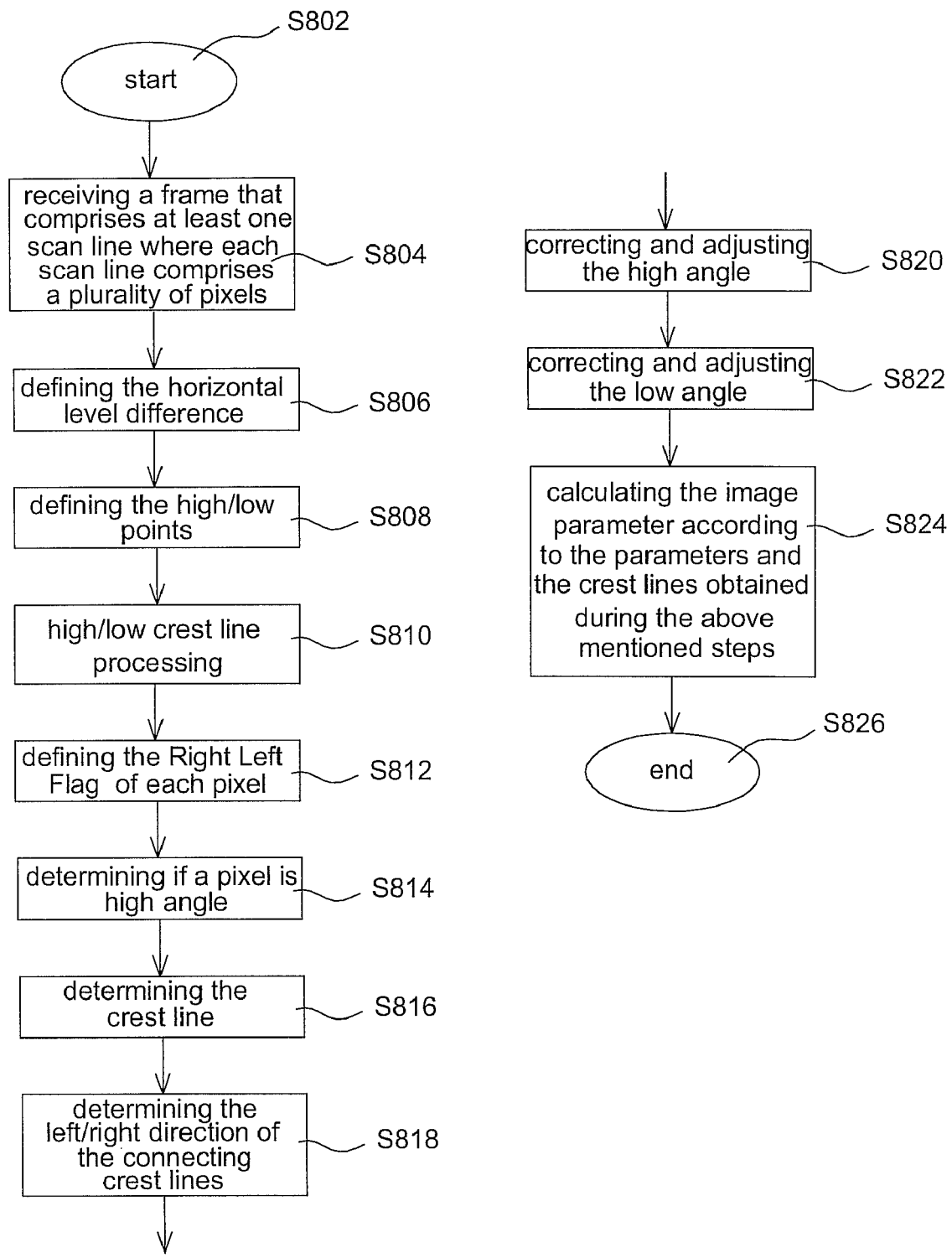
FIG. 8 shows a flow chart illustrating the image processing method according to another embodiment of the invention.

As shown in FIG. 8, the image processing method according to one other embodiment of the invention is described by the criteria and the related indexes. The method comprises the following steps:

Step S802: start;

Step S804: receiving a frame that comprises at least one scan line where each scan line comprises a plurality of pixels;

Step S806: defining the horizontal level difference, that is, the luminance relation between every pair of pixels in the frame. The equation for defining the horizontal level difference according to one embodiment of the invention is given by:

$$\text{DFV} = \text{ABS}(Y[i][j], Y[i][j+1]) \quad (1)$$
$$\text{If } (\text{DFV} < \text{TH})$$
$$\quad \text{HDS}[i][j] = 1 \Rightarrow \text{Zero}$$
$$\text{Else if } (Y[i][j] < Y[i][j+1])$$
$$\quad \text{HDS}[i][j] = 2 \Rightarrow \text{Up}$$
$$\text{Else}$$
$$\quad \text{HDS}[i][j] = 0 \Rightarrow \text{Dn}.$$

Figure 9:
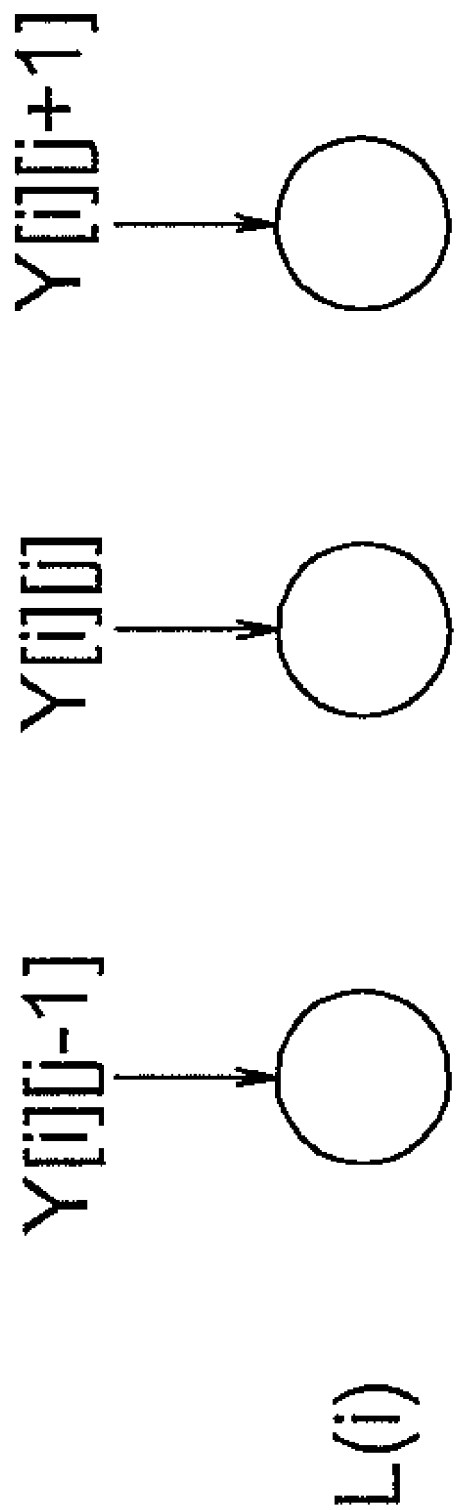
FIGS. 9~14B show the reference schematic diagrams conjugating with the description of FIG. 8.

Equation (1) defines the luminance relation between any two pixels of a scan line to be of similar luminance (horizontal), luminance becoming brighter (turning upward), and luminance becoming darker (turning downward). In equation (1), difference value (DFV) is the absolute value of the difference between the luminance values Y, Y[i][j] and Y[i][j+1], of the two pixels, threshold value (TH) is a predetermined luminance range, and horizontal difference state (HDS) is the state of the horizontal level difference of the luminance of the two pixels, being similar, turning upward, or turning downward. As shown in FIG. 9, it is assumed that the luminance Y values of the two pixels of a scan line of the frame received are the Y[i][j] and the Y[i][j+1]. The difference between these two luminance values Y is to be determined. If the difference is less than a pre-determined value TH, the state of the horizontal level difference is defined to be horizontal. If the right hand side is larger than the left hand side, it is determined to be upward. If the right hand side is smaller than the left hand side, it is determined to be downward. Thus, the relation between any pair of pixels among all the pixels of the frame can be determined by the same way.

Step S808: defining the high/low points, that is, the high/low relation between any pair of pixels. The equation for defining the high/low points according to one embodiment of the invention is given by:

$$\text{if}((\text{HDS}[i][j-1]==0) \&\& (\text{HDS}[i][j] !=0)) \quad (2.1)$$
$$\quad \text{HLF}[i][j]=0 \Rightarrow \text{Low}$$
$$\text{Else if } ((\text{HDS}[i][j] == 2) \&\& (\text{HDS}[i][j-1] != 2))$$
$$\quad \text{HLF}[i][j] = 0 \Rightarrow \text{Low} \quad (2.2)$$
$$\text{Else if } ((\text{HDS}[i][j-1] == 2) \&\& (\text{HDS}[i][j] != 2))$$
$$\quad \text{HLF}[i][j] = 2 \Rightarrow \text{High} \quad (2.3)$$
$$\text{Else if } ((\text{HDS}[i][j] == 0) \&\& (\text{HDS}[i][j-1] != 0))$$
$$\quad \text{HLF}[i][j] = 2 \Rightarrow \text{High} \quad (2.4)$$
$$\text{Else}$$
$$\quad \text{HLF}[i][j] = 1 \Rightarrow \text{Other} \quad (2.5)$$

Equations (2.1~2.5) define the high/low relation between any pair of pixels of the scan line. HDS is the state of the horizontal level difference of the luminance of the two pixels being similar, turning upward, or turning downward and high low flag (HLF) is the flag indicating the state of the pixel being high, low, or others. As shown in FIG. 9, it is assumed that the luminance values Y of the first, the second and the third pixels are the Y1(Y[i][j−1]), the Y2(Y[i][j]) and the Y3(Y[i][j+1]). The details of the equations are described in the following:

Equation (2.1): If the state of the horizontal level difference between Y1 and Y2 is downward (that is, the HDS is equal to 0) and the state of the horizontal level difference between Y2 and Y3 is not downward (that is, the HDS is not equal to 0), the Y[i][j] belongs to the lower state and is labeled as Low; or Equation (2.2): If the state of the horizontal level difference between Y2 and Y3 is upward (that is, the HDS is equal to 2) and the state of the horizontal level difference between Y1 and Y2 is not upward (that is, the HDS is not equal to 2), the Y[i][j] belongs to the lower state and is labeled as Low; or Equation (2.3): If the state of the horizontal level difference between Y1 and Y2 is upward (that is, the HDS is equal to 2) and the state of the horizontal level difference between Y2 and Y3 is not upward (that is, the HDS is not equal to 2), the Y[i][j] belongs to the higher state and is labeled as High; or Equation (2.4): If the state of the horizontal level difference between Y2 and Y3 is downward (that is, HDS is equal to 0) and the state of the horizontal level difference between Y1 and Y2 is not downward (that is, HDS is not equal to 0), the Y[i][j] belongs to the higher state and is labeled as High; or Equation (2.5): Others states with HLF[i][j]=1, the Y[i][j] belongs to the horizontal state and is labeled as Others.

By processing in the manner as the above, any pixel of the frame can be determined whether it belongs to the high point, the low point, or the horizontal point. The corresponding high/low relation between every two points can be determined.

Figure 10:
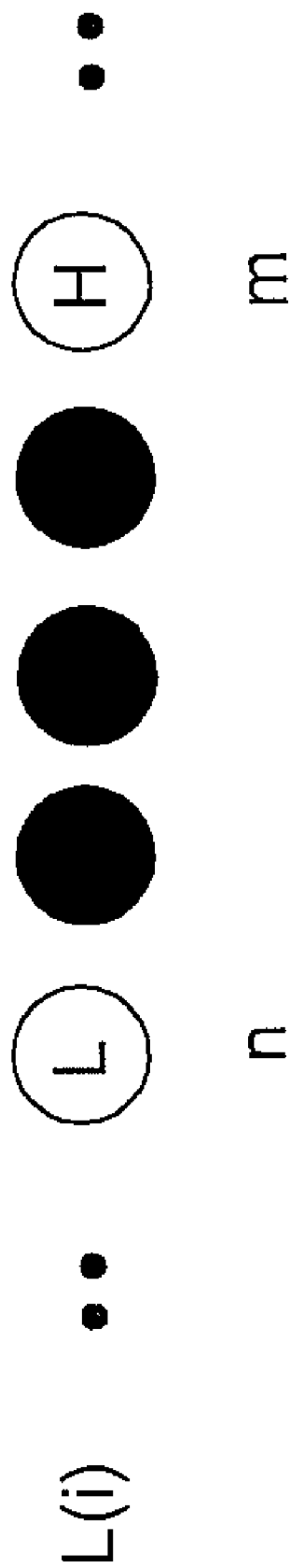

Step S810: the high/low crest line processing step to generate at least a high crest line by connecting the high point pixels and to generate at least a low crest line by connecting the low point pixels. According to one embodiment of the invention as shown in FIG. 10, the connecting range criterion is set before the connecting process. It is assumed that a low point L of a scan line is positioned at the $n^{th}$ point of the scan line and the position of a high point is at the $m^{th}$ point. Then, the length between the high point H and the low point L must be less than a predetermined distance d. If (m-n) is less than d, the High Low Index (HLI) of the high point and the low point is equal to (m-n). If (m-n) is larger than or equal to d, the HLI of the high point and the low point is equal to 0. The equation for the high/low crest line processing according to one embodiment of the invention is given by:

$$\text{If } (m-n < d) \quad (3)$$
$$\quad \text{HLI} = m - n$$
$$\text{Else}$$
$$\quad \text{HLI}=0.$$

By processing in the manner as the above, the system resources used to connect the high points and the low points for generating crest lines can be controlled within a predetermined range.

Step S812: defining the Right Left Flag (RLF) of each pixel. RLF [i][j]=0 indicates that the angle of the connecting line is toward the left; RLF [i][j]=1 indicates that the state of the pixel is unknown; RLF [i][j]=2 indicates that the angle of the connecting line is toward the right; and RLF [i][j]=3 indicates that the pixel belongs to the high angle (that is, vertically connecting).

Figure 11:
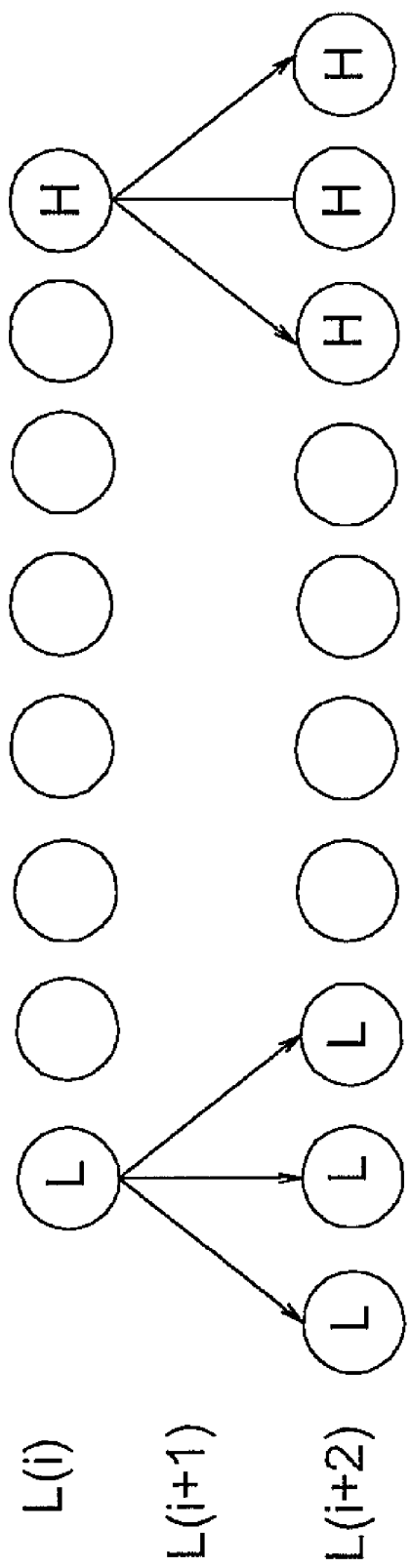

Step S814: determining if a pixel is high angle. According to one embodiment of the invention as shown in FIG. 11, as the positions of the high/low points are close together, that is, the HLI (m-n) is within 1, the RLF of the pixels is equal to 3. These pixels are the high angle pixels. These pixels have higher connecting priorities and are to be connected to each other first (as indicated by the arrows in the figure) instead of further comparing with other two nearby pixels during the process of connecting the pixels into the crest line.

Step S816: determining the crest line. According to one embodiment of the invention as shown in FIG. 12, the right index (RI) or the left index (LI) of the right or left segment should be less than 2*HLI+1 and smaller than a predetermined length; or the right value (RV)/left value (LV) is equal to the average of the Y value component differences of the two high low points; or the difference of the two HLI's must be smaller than HLI/4+2, otherwise the RV/LV is directly set to 255.

Figure 12:
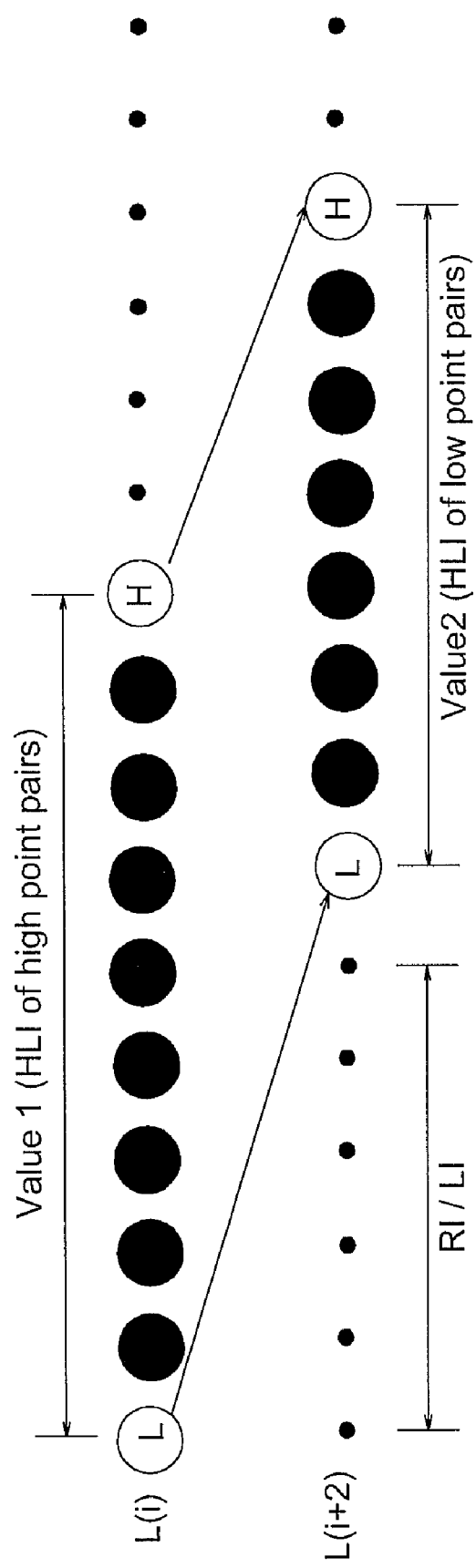

Referring to FIG. 12, the equation for determining the RV/LV by another approach is given as:

```
Value1 = HLI of high point pairs                          (4)
Value2 = HLI of low point pairs
Value3 = ABS(Value1,Value2)
If (Value3 > TH)||(Value1 < TH)||(Value2 < TH) RV/LV =
255
```

Step S818: determining the left/right direction of the connecting crest lines. The equation for determining the left/right direction of the connecting crest lines according to one embodiment of the invention is given by:

```
if (RV+TH < LV)                                           (5)
    RLF = 2;
else if (RV > LV+TH)
    RLF = 0;
Else if(LAI> 2*LOW_ANGLE_DETECTION_NUMBER)
    RLF = 2;
else if (LAI < 2*LOW_ANGLE_DETECTION_NUMBER)
    RLF = 0;
else
    RLF = 1;
``` where the low angle index (LAI) is the result of calculating the low angle from the previous scan line.

Another criterion for determining the left/right direction of the connecting crest lines according to another embodiment of the invention is that the directions of the two high low crest lines to be connected must be of the same direction, otherwise they cannot be connected, as indicated by the two arrows in FIG. 12. If such condition is met, all the related points are recorded as indexes F right index (FRI)/F left index (FLI) and FRI/FLI=RI/LI.

The equation for calculating the low angle of every pixel from the parameter and the above mentioned index according to one embodiment of the invention is given as:

```
if (FRI)                                                  (6)
{if (FLI)
LAI = 2*LOW_ANGLE_DETECTION_NUMBER;
    else
LAI=2*LOW_ANGLE_DETECTION_NUMBER+FRI;
}
else
{
    if(FLI)
LAI= 2*LOW_ANGLE_DETECTION_NUMBER-FLI;
    else
        LAI = 2*LOW_ANGLE_DETECTION_NUMBER;
}.
```

Figure 13:
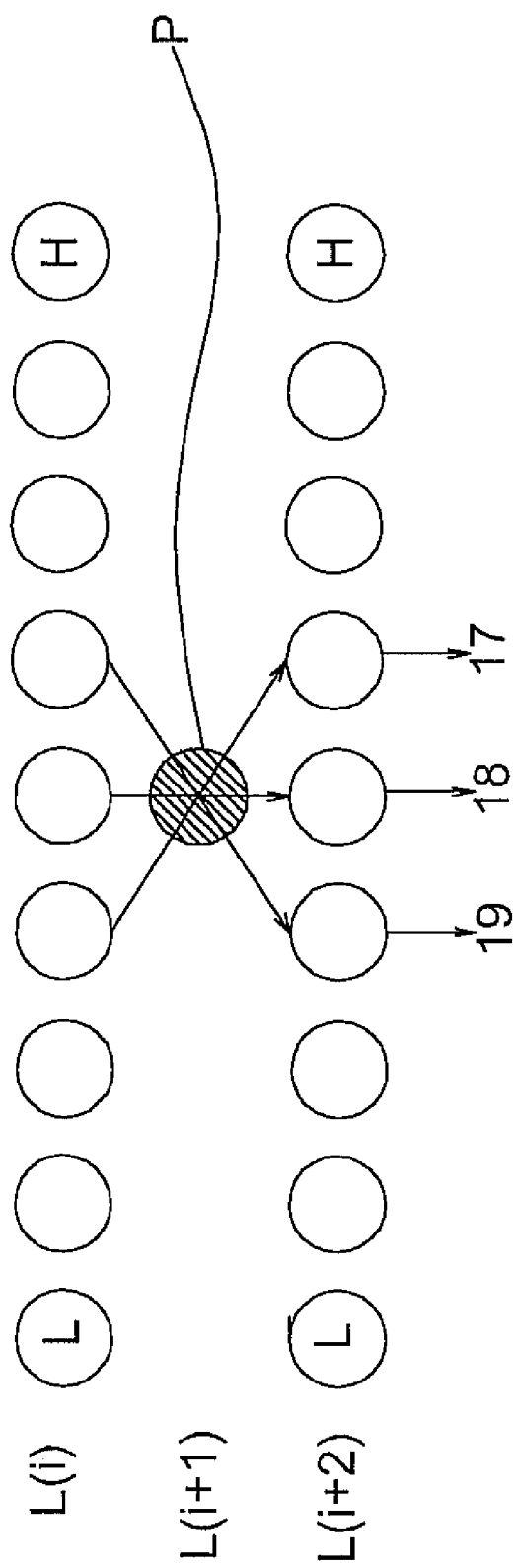

Step S820: correcting and adjusting the high angle. According to one embodiment of the invention as shown in FIG. 13, it is assumed that the pixel P has been determined to be a high angle point. Then, the Y value component difference from the Y value component differences among the three pixels (the left, middle, and right three pixels), that are either above or below the pixel P, that can have the luminance of the image smoothly presented, can be selected as the low angle index (LAI) of the P pixel. The LAI can be equal to 19, 18, or 17, as shown in the figure.

Figure 14A:
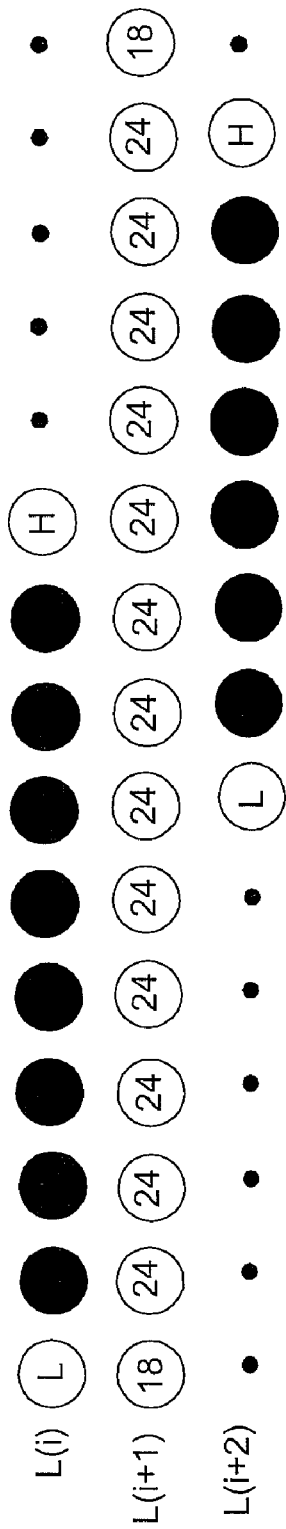
Figure 14B:
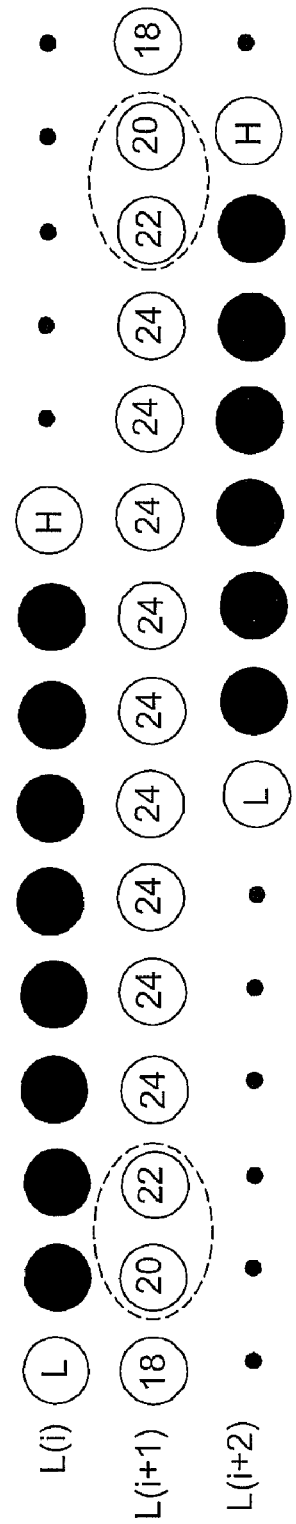

Step S822: correcting and adjusting the low angle. One embodiment of the invention is shown in FIGS. 14A and 14B. FIG. 14A shows the luminance of the pixels of the second scan line L (i+1) before correction. From the figure, the luminance variation is too strong, such as changing directly from the luminance value 18 to the luminance value 24 as shown in FIG. 14A. According to one embodiment of the invention, the luminance of the pixels in FIG. 14A can be adjusted to be gradually increasing, such as changing from 18, 20, 22, to 24 as shown in FIG. 14B. Thus, the luminance changes of the image can be smoother.

Step S824: calculating the image parameter (at least comprising the luminance color difference value) according to the parameters (the related indexes) and the crest lines obtained during the above mentioned steps;

Step S826: end.

The image processing method according to the embodiments of the invention utilizes the relatively low point and the relatively high point of the luminance of the pixels in the frame to generate the crest line. Then, by connecting the crest lines, the corresponding relatively low point and relatively high point of the in-between line with unknown image parameters can be calculated. The average of the luminance color difference value of the pixels is calculated by determining the calculated angle of each pixel. Then, the luminance color difference value of every pixel of the in-between line is calculated from the average of the luminance color difference value of the pixels.

Although the description of the invention is by way of above-mentioned examples of embodiment, however, it should not be construed as any limitation on the scope of the invention. Various modifications or changes of the method of utilizing the crest lines of the image distribution for image processing can be performed by those who are skilled in the art without deviating from the scope of the invention.

What is claimed is:

1. An image processing method, comprising:
   receiving a frame that comprises a plurality of pixels;
   analyzing the luminance (Y) of each pixel to find out the luminance distribution of the frame;
   obtaining a plurality of crest lines for the luminance distribution according to the state of the luminance distribution; and
   performing image processing for the frame according to the crest lines,
   wherein the method for obtaining crest lines comprises the following steps:

calculating a plurality of related indexes of the luminance between each pixel and other pixel according to a plurality of predetermined criteria to determine pixels that are relatively darkest and relatively brightest within a predetermined area of the frame; and connecting the relatively darkest pixels into a line for generating at least a first crest line according to the related indexes and connecting the relatively brightest pixels into a line for generating at least a second crest line according to the related indexes.

2. The image processing method according to claim 1, wherein performing image processing for the frame at least comprises obtaining image parameters of each pixel.

3. The image processing method according to claim 1, wherein the related indexes comprise one(s) selected from the group consisting of the following or combination thereof: horizontal level difference, high/low points, high/low lines, high angles, crest line estimation, right/left flag.

4. An image processing method, comprising:
receiving a frame that comprises at least a first, at least a second, and at least a third scan lines wherein the first and the third scan lines have a plurality of pixels and the pixel parameters of the second scan line are unknown;

analyzing the luminance (Y) of each pixel to find out the luminance distribution of the frame;

calculating a plurality of related indexes of the luminance between each pixel and other pixel according to a plurality of predetermined criteria so as to determine the relatively darkest and relatively brightest pixels within a predetermine length of the first and third scan lines;

generating a first crest line by connecting the relatively darkest pixels of the first and the third scan lines according to the related indexes and generating a second crest line by connecting the relatively brightest pixels of the first and the third scan lines according to the related indexes;

deriving the luminance value of each pixel of the second scan line between the first and the second crest lines according to the luminance of pixels of the two crest lines; and obtaining the image parameter of each pixel of the second scan line according to the luminance values of the second scan line.

5. The method according to claim 4, wherein the related indexes comprise one(s) selected from the group consisting of the following or combination thereof: horizontal level difference, high/low points, high/low lines, high angles, crest line estimation, right/left flag.

6. The method according to claim 4, wherein the image parameter includes at least the luminance color difference value.

7. The image processing method according to claim 4, wherein the second scan line is between the first and the third scan lines.

8. An image processing method, comprising:
receiving a frame that comprises a plurality of pixels;
defining the horizontal level difference of neighboring pixels for generating at least a first index;
defining the high/low point of neighboring pixels for generating at least a second index;
setting at least one connecting criterion of the high/low crest line for generating at least a third index;
defining the right/left flag of each pixel for generating at least a fourth index;
determining if the pixel belongs to the high angle pixel for generating at least a fifth index;
determining the left-to-right width of the crest line for generating at least a sixth index;
determining the left/right directions of the connecting crest lines for generating at least a seventh index;
connecting the high point pixels for generating at least a first crest line and connecting the low point pixels for generating at least a second crest line according to the first, second, third, fourth, fifth, sixth, and seventh indexes; and
calculating the image parameters of the pixels according to the first, second, third, fourth, fifth, sixth, seventh indexes and the crest lines.

9. The image processing method according to claim 8, further comprising fine tuning the luminance of the pixels according to the calculation results of the image parameters to have the luminance of the scan lines smoothly presented.

* * * * *